United States Patent
Ushio et al.

(10) Patent No.: US 6,264,847 B1
(45) Date of Patent: Jul. 24, 2001

(54) METHOD OF PROCESSING CYANIDE IONS BY OZONE

(75) Inventors: Ryozo Ushio; Naoko Kikuta; Koji Sasaki, all of Ichikawa; Yuji Imaizumi, Niihama; Ryoichi Nakayama, Niihama; Iichi Nakamura, Niihama; Takao Suzuki; Masayuki Hisatsune, both of Tokyo, all of (JP)

(73) Assignee: Sumitomo Metal Mining, Co., Ltd., Tokyo (JP)

( * ) Notice: Subject to any disclaimer, the term of this patent is extended or adjusted under 35 U.S.C. 154(b) by 0 days.

(21) Appl. No.: 09/437,432

(22) Filed: Nov. 17, 1999

(30) Foreign Application Priority Data

Nov. 18, 1998  (JP) .................................................. 10-328257

(51) Int. Cl.$^7$ ....................................................... C02F 1/78
(52) U.S. Cl. .......................... 210/752; 210/758; 210/760; 210/904
(58) Field of Search .................................... 210/752, 758, 210/760, 904

(56) References Cited

U.S. PATENT DOCUMENTS

| | | | |
|---|---|---|---|
| 3,510,424 | * | 5/1970 | Zumbrunn . |
| 3,920,547 | * | 11/1975 | Garrison et al. . |
| 4,105,545 | * | 8/1978 | Muller et al. . |
| 4,341,641 | * | 7/1982 | Novak . |

* cited by examiner

Primary Examiner—David A. Simmons
Assistant Examiner—Betsey Morrison Hoey
(74) Attorney, Agent, or Firm—Helfgott & Karas, P.C.

(57) ABSTRACT

A method is provided for decomposing free cyanide ion and metallic cyano complex ions in a liquid, comprising the steps of bringing the liquid into contact with ozone gas in a counterflow relation in the condition that the pH of the liquid is at least 10 with the mass flow rate of the ozone in the ozone gas up to 20 mg per minute per liter of liquid, and then bringing the liquid into contact in a counterflow relation with ozone gas having an ozone concentration of at least 150 g/m$^3$ in the condition that the pH of the liquid is 7.0 to 9.5.

26 Claims, 3 Drawing Sheets

METHOD OF PROCESSING CYANIDE IONS BY OZONE

FIELD OF THE INVENTION

This invention relates to a method of processing cyanide ions by ozone, and specifically to a method of processing waste fluids that contain cyanide ions including metallic cyano complex ions that are difficult to decompose.

BACKGROUND OF THE INVENTION

Waste fluids that contain cyanide ions are typically produced by cyanide refining, and other industrial waste fluids sometimes contain cyanide. The waste fluid referred to here is typically waste water or waste slurry. Moreover, the metallic cyano complex ions that are difficult to decompose referred to here are typically iron cyano complex ions and nickel cyanide ions.

The cyanide refining method is one method for recovering gold from gold ore. In this method, for example, the gold ore is crushed, then the gold is in contact with the solution that contains cyanide ions and leached out as gold cyano complex ion, and then finally the gold is recovered from the solution after leaching. In this method the cyanide ions are used repeatedly. This cyanide refining method is considered to be an excellent method from the aspect that it is possible to recover even small amounts of gold.

In the cyanide refining method which uses cyanide ions, there is always the danger that the cyanide ions will be included in the water that adheres to the leaching residue that occurs, or that the cyanide ions will be included in the surplus water, site water or the like, and so processing the waste fluid which includes cyanide ions that come from the cyanide refining method has become a large problem.

Up until now, to overcome this problem, it was normal practice that the waste fluid was made harmless by using various methods that are mentioned later, and then the waste fluid was diluted with large amounts of water before discharging it outside of the plant. However, in order to conform to the recent movements which emphasize the importance of environment such as reviewing environmental standards, these methods are not sufficient, and in plants where it is only possible to use limited plant water, this has become a major problem, and it has become difficult to adopt the cyanide refining method.

The natural decomposition method, acid evaporation recovery method, hydrogen peroxide method, alkali chlorine method and $SO_2$.AIR method have been used or tried in the past to decompose the cyanide ions in the waste fluid.

In the case of the natural decomposition method, a dam or the like is constructed next to the refinery, and the leaching residue or waste fluid which contains cyanide ions is temporarily stored in this dam and left for several months and decomposed through natural purification and the water itself is allowed to evaporate. In this natural decomposition method, it is known that since only natural purification capabilities are used, a very large dam is required, and that for example, in the winter, the purification speed is greatly reduced when the water in the dam freezes. Furthermore, from the aspect of protecting the environment, using this method as the sole processing method is seen as a problem.

With the acid evaporation recovery method, acid is added to the waste fluid to lower the pH, and then the cyanide ions are transformed to hydrogen-cyanide and evaporated, and absorbed by an alkali or the like for recovery. In this method, since an acid is used, it is possible to remove not only the free cyanide ion in the waste fluid, but also all of the metallic cyano complex ions which includes the iron cyano complex ion. However, from facilities and economic or efficiency point of view, it is not practical to use this method for processing the leaching residue that occurs during the cyanide refining process, and so it rarely used.

With the alkali chlorine method, hydrogen peroxide method and $SO_2$.AIR method, the cyanide ions in the waste fluid are oxidized to be decomposed, and in these methods chlorine, hypochlorous acid, hydrogen peroxide or air are used as a direct oxidizing agent. In particular, the alkali chlorine method and $SO_2$.AIR method have a good record.

Of these three methods, from the aspect of safety of the by products and the processing cost, the $SO_2$.AIR method is the most favorable, and in newly developed god mines, the $SO_2$.AIR method is often used.

What can be said safely for a common characteristic among the three methods mentioned above is that the main decomposable component is the free cyanide ion, and it is not always possible to decompose all of the metallic cyano complex ions. For example, if the iron grade in the gold ore is high, the free cyanide ion bonds to the iron to form iron cyanide complex ions, so the concentration of iron in the solution after leaching may be high. The iron cyano complex ion is the most difficult of all the cyanide compounds to decompose, and with the hydrogen peroxide method it is not possible to decompose the iron cyano complex ion, and decomposition of nickel cyano complex ion is also incomplete.

Even in the alkali chlorine method, it is difficult to decompose the iron cyanide complex ion. In these examples, it is not possible to decompose the iron cyano complex ions because there exists a very strong bonding force between the iron atoms and cyanide ions. Thus, decomposition will not be possible if oxidation is not strong enough to break such bonding force.

On the other hand, the $SO_2$.AIR method does not decompose the iron cyano complex ion through oxidation with air, but the iron cyano complex ion is caused to react with copper ions to form copper ferrocyanide, and this is precipitated out and removed. However, if there is not enough copper ions in the waste fluid, it is necessary to add copper ions from the outside. Also, even if precipitation is possible by adding copper ions, the cyanide is simply separated through precipitation, and permanent removal by decomposition of the cyanide ions is not possible.

In this way, it can be said that in the $SO_2$.AIR method the iron cyano complex ion is separated and removed, but in actuality, the cyanide ions continue to exist after separation, and is partially decomposed by ultra violet rays at the location where the precipitate that occurred during processing is controlled, and then flows out as metallic cyano complex ions.

Of these, decomposing cyanide ions from the waste of the cyanide refining has been indicated as a possibility in North America since the middle of the 1970s. However, in research reports up until now, it was reported that there is a possibility of ozone decomposition of free cyanide ion and relatively easily decomposed metallic cyano complex ions, but that ozone decomposition of iron cyano complex ion, which is difficult to decompose, is not possible.

In regard to ozone, before 1980 it was only possible to obtain gas containing ozone (called ozone gas below) with an ozone concentration of 20 $g/m^3$ or less, however in the 1980s, ozone gas with an ozone concentration of 40 $g/m^3$ was actually being used by research organizations.

However, even when using this kind of ozone gas with a high ozone concentration, the decomposition reaction with iron cyano complex ion is reported to have only proceeded to a concentration of iron cyano complex ion that was half the initial concentration when several hours were used as the reaction time, and even today this method has yet to reach industrial standards.

In the materials from the "Ozone World Conference in Kyoto" that was held in 1997, it was reported that iron cyano complex ions were decomposed in the neutral pH region. This was a report of the results of the test performed by Ruhle et al. of decomposing iron cyano complex ions under the conditions of; pH7, ozone filling speed of 9 mg/liter-min at 24 liters/hour of ozone gas (according to the inventors calculation, the ozone concentration of the ozone gas was estimated to be 22.5 g/m$^3$), however, after a reaction time of 180 minutes, approximately 60% of the initial concentration was finally decomposed, leaving approximately 40% that still not decomposed.

In the report examples mentioned above, the decomposition speeds at each pH level of the iron cyano complex ion are not compared, and nothing has been mentioned about pH and the effect that pH has on the decomposition of iron cyano complex ion. Moreover, in none of the reports, including the report by Ruhle et al., was there any suggestion that there was a relationship between the decomposition of iron cyano complex ion and pH.

Recently, from the view point of environmental protection, there is a desire to find a higher-level decomposition processing method for decomposing and processing the cyanide ions that exist in the waste fluid from cyanide refining in newly developed methods of gold mining. As a result, there are expectations to find a decomposition method that is more efficient and effective than the $SO_2$.AIR method. Not only is there a search to find a method for decomposing iron cyano complex ion, but there is a need to seriously consider measures for protecting the environment in overall mining development, including, for example, the problem of acidification of already processed waste fluid that is generated as a result of oxidizing the surplus $SO_2$ in the $SO_2$.AIR method used up until now (the waste water comes from cyanide processing is changed to a sulfate acid, and cannot be disposed of as is), or the problem of handling the thiocyanic ions that generate cyanide and occur due to decomposition that has only proceeded 10% by the $SO_2$.AIR method, or furthermore the problem of safely transporting the raw $SO_2$ material used as the processing agent.

The method of processing cyanide ions including iron cyano complex ion in cyanide refining waste with ozone has been avoided because of the initial investment cost for ozone generation equipment and the high cost of generating ozone. However, as a result of recent technological developments, the required amount of electric power required to generate one unit of ozone has greatly decreased, so cost wise it is becoming more inexpensive. However, actually, there has not been enough investigative research performed to obtain basic data regarding the decomposition of iron cyano complex ion, and establishment of a technologically practical and detailed method for processing the aforementioned waste with ozone is still a long way off.

When processing and decomposing cyanide ions with ozone with respect to the waste water that occurs during cyanide refining, it is necessary to reconsider the processing method so that it includes decomposing not only free cyanide ion but also the metallic cyano complex ions that are difficult to decompose. To do this, it can be imagined that the process will be divided into two or more steps when separate processing methods are used to process the free cyanide ion and the difficult to decompose metallic cyano complex ions. If that is the case, then important points to be considered are first, to have sufficient decomposition capability, and second, how to reduce the overall processing cost while at the same time keeping the reaction speed high.

SUMMARY OF THE INVENTION

This invention takes into consideration of the aforementioned problems, and provides a method for processing liquids containing cyanide ions, specifically difficult-to-decompose metallic cyano complex ions, for example the waste fluid from cyanide refining to make them harmless, and provdes a closed cyanide refining to make them harmless, and provides a closed cyanide refining method that uses this method.

DETAILED DESCRIPTION OF THE PREFERRED EMBODIMENT

Figure 1:
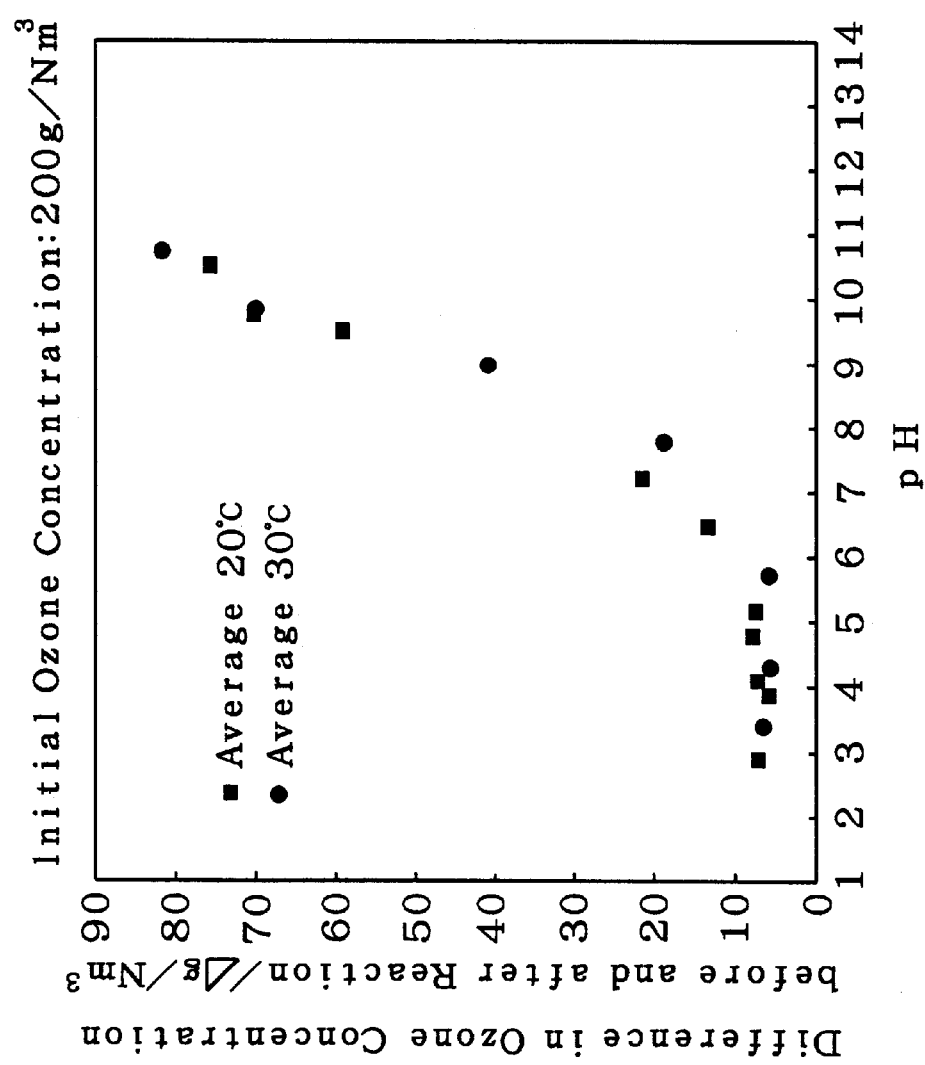
FIG. 1 is a graph showing a relation between pH and ozone self-consumption rate.

The method for processing cyanide ions in liquid in this invention is characterized by decomposing the difficult-to-decompose metallic cyano complex ions in the liquid such as the waste fluid from the cyanide refining of gold by bringing ozone gas with an ozone concentration of 150 g/m$^3$ or more into contact with the liquid. When doing this, it is desirable if the pH value of the liquid when the ozone gas is brought into contact with the liquid is in the range of 7.0 to 9.5.

Moreover, when decomposing the free cyanide ion and metallic cyano complex ions in the aforementioned liquid with the use of ozone gas, it is best if ozone gas is brought into contact with the liquid when the pH of the liquid is 10 or greater, and then in the state when the pH of the liquid is 7.0 to 9.5, it is brought into contact with ozone gas having an ozone concentration of 150 g/m$^3$ or greater.

Furthermore, in the cyanide ion processing method of this invention, when decomposing the free cyanide ion and metallic cyano complex ions in the liquid by the use of ozone gas, it is best to use a reaction tank that has been divided into two or more areas, or two or more reaction tanks that are connected together in series, and then to bring the liquid and the ozone gas into contact by letting them flow against each other in a counterflow relation.

Particularly, when brining the ozone gas into contact with the liquid having a pH of 10 or more, it is best if the mass flow rate of the ozone in the ozone gas is 20 mg or less per minute per liter of liquid.

In the cyanide ion processing method of this invention, it is best to adjust, with the downstream reaction tank, the amount and ozone concentration of ozone gas entering in the upstream reaction tank (as seen from the flow of the liquid).

Also, when decomposing the free cyanide ion and metallic cyano complex ions in the liquid by ozone gas, it is best if a reaction tank that is divided into two or more sections, or two or more reaction tanks connected in series are used, and the free cyanide ion and easily decomposed metallic cyano complex ions are brought into contact with the ozone gas in the solution with a pH of 10 or more and decomposed in the upstream section or tank (as seen from the flow of the liquid), and then in the downstream section or reaction tank, the difficult-to-decompose metallic cyano complex ions are brought into contact with ozone gas having an ozone concentration of 150 $g/m^3$ or more and decomposed.

Furthermore, it is best if the mass inflow speed of the ozone in the ozone gas is 20 mg or less per minute per liter of liquid.

After processing the waste fluid with the cyanide processing method of this invention, it is best if the discharged exhaust gas, which contains oxygen, is reused in the pre-oxidation process for the cyanide refining of gold.

The cyanide ion processing method of this invention for processing waste fluid, is based on the decomposition of difficult-to-decompose metallic cyano complex ions and free cyanide ion by the use of ozone.

As a result of earnest research of the decomposition of difficult-to-decompose metallic cyano complex ions, the inventors found that the reaction speed of decomposition of the difficult-to-decompose metallic cyano complex ions largely depends on the relationship between ozone concentration and pH when ozone is used, and also that when free cyanide ion is contained in the fluid being processed, the ozone oxidation reaction of the free cyanide ion takes priority over all other oxidation reactions of the metallic cyano complex ions. The inventor incorporated these findings into their invention.

In other words, with this invention, when decomposing the difficult-to-decomposed metallic cyano complex ions in waste water or waste slurry that contains difficult-to-decompose metallic cyano complex ions such as iron cyano complex ion and nickel cyano complex ion, the waste water or waste slurry is brought into contact with ozone gas whose ozone concentration is 150 $g/m^3$ or greater. Moreover, it is desirable if the pH value at the time of contact is in the range of 7.0 to 9.5.

Moreover, when decomposing the difficult-to-decompose metallic cyano complex ions in waste water or waste slurry that contain free cyanide and difficult-to-decompose metallic cyano complex ions such as iron cyano complex ion or nickel cyano complex ion with the use of ozone gas, it is best to first, make the pH of the waste water or waste slurry 10 or more before bringing it into contact with the ozone gas, then make the pH 7.0 to 9.5 and bring the waste water or waste slurry into contact with ozone gas having an ozone concentration of 150 $g/m^3$ or greater.

Furthermore, when bringing the aforementioned waste water or waste slurry into contact with the ozone gas, it is best to use a reaction tank that is divided into two or more sections, or two or more reaction tanks that are connected in series, and to bring the waste water or waste slurry come in contact with the ozone gas by having them flow against each other in a counterflow relationship. This invention is typically used in cyanide refining.

Decomposition of difficult-to-decompose metallic cyano complex ions and free cyanide ion with the use of ozone is further described below.

Decomposition of Cyanide Ions with High-concentration Ozone

It is known that if free cyanide ion is to be decomposed, it is possible to decompose the cyanide ion well in a high pH range even with using a low-concentration ozone gas with a concentration such as 20 $g/m^3$. However, in the case of decomposing metallic cyano complex ions, and particularly iron cyano complex ion, it has been found that decomposition will only proceed partially under these conditions.

The inventors, through experimentation, have found a relationship between the decomposition rate of iron cyano complex ion and the elapsed time for each ozone concentration of ozone gas, and have shown part of the results in Table 1.

Table 1 shows the total cyanide ion concentration (mg/liter of solution) in solution when performing the cyanide ion decomposition test where the pH is maintained in a range of 7.0 to 9.5, and where the ozone concentration of ozone gas that comes into contact with the iron cyano complex ion solution is changed. According to this table, if a high-concentration ozone gas with an ozone concentration of 150 $g/m^3$ is used, the iron cyano complex ion is decomposed at a decomposition rate of 65.8% at a reaction time of 180 minutes, and if a high-concentration ozone gas with an ozone concentration of 200 $g/m^3$ is used, decomposition rate is 96.7% at a reaction time of 180 minutes. From these results, it can be seen that if a high-concentration ozone gas with an ozone concentration of 150 $g/m^3$ or more is used, this method of decomposing iron cyano complex ion with ozone is sufficiently practical.

TABLE 1

| elasped time | total cyanide ion concentration (mg/liter of solution) ozone concentration supplied | | | |
|---|---|---|---|---|
| (min) | 120 $g/m^3$ | 150 $g/m^3$ | 180 $g/m^3$ | 200 $g/m^3$ |
| 0 | 240 | 240 | 240 | 240 |
| 30 | 226 | 210 | 160 | 140 |
| 60 | 197 | 160 | 105 | 84 |
| 120 | 149 | 110 | 45 | 23 |
| 180 | 125 | 82 | 20 | 8 |

Self Decomposition of Ozone in Liquid Phase

Including the use of ozone gas, the efficiency of decomposition of the cyanide ions is considered to be generally good in a range of high pH, however, the inventors performed the following test to confirm that it is for decomposition of free cyanide ions.

In other words, the inventors prepared a hermetic-type reaction tank that also served as a gas-liquid separator, and an ejector-type gas-liquid contact device that was connected in series to that reaction tank. As the test water, 1.5 liters of distilled water was put into the reaction tank, and that test water is circulated by a pump between the ejector-type gas-liquid contact device and reaction tank, and ozone gas with an ozone concentration of 200 $g/m^3$ is fed into the ejector-type gas-liquid contact device at a constant rate of 0.5 liters per minute so that it comes into contact with the test water. The ozone gas is completely absorbed by the test water, and after it enter into the reaction tank, it is discharged from the reaction tank by gas-liquid separation. Gas-liquid separation is performed by a separation method using the head space formed on the top of the reaction tank.

Also, the ozone concentration (discharged ozone concentration) of the ozone gas directly after it is discharged from the reaction tank, and the ozone concentration (inlet ozone concentration) of the ozone gas directly before it enters into the ejector-type gas-liquid contact device are measured with an ultraviolet-absorption-type ozone gas concentration meter.

The test water (liquid) was kept at a prescribed value of pH, and brought into contact with the ozone gas for approximately 20 minutes, and after making sure that the concentration of the ozone gas that was discharged from the reaction tank was then converged at a level, and that the reaction system was in equilibrium, the aforementioned discharged ozone concentration and inlet ozone concentration were read, and the difference was taken to be the self decomposition amount of the ozone inside the reaction tank. By repeating this, the self decomposition amount inside the reaction tank was measured for each pH. A part of those results are shown in Tables 2-1 and 2-2 and FIG. 1.

TABLE 2-1

At solution temperature 20° C.

| PH | Difference in Ozone Concentration $\Delta g/m^3$ | Self Decomposition Rate % |
|---|---|---|
| 2.78 | 6.1 | 3.1 |
| 3.84 | 4.6 | 2.3 |
| 4.13 | 6.4 | 3.2 |
| 4.73 | 6.9 | 3.5 |
| 5.16 | 6.7 | 3.4 |
| 6.50 | 13.8 | 6.9 |
| 7.33 | 22.1 | 11.1 |
| 9.52 | 59.0 | 29.5 |
| 9.69 | 70.3 | 35.2 |
| 10.4 | 75.3 | 37.7 |

TABLE 2-2

At solution temperature 20° C.

| pH | Difference in Ozone Concentration $\Delta g/m^3$ | Self Decomposition Rate % |
|---|---|---|
| 3.43 | 5.3 | 2.7 |
| 4.43 | 4.6 | 2.3 |
| 5.72 | 5.0 | 2.5 |
| 7.90 | 18.0 | 9.0 |
| 8.97 | 40.7 | 20.4 |
| 9.76 | 69.8 | 34.9 |
| 10.5 | 81.8 | 40.9 |

By adding a weak electrolytic buffer salt as a pH adjustment agent, there is a possibility of giving rise to ozone consumption by a so-called 'OH radical scavenger', so here sodium hydroxide and hydrochloric acid are used as the pH adjustment agent.

The same effect was also obtained if a floatation-type or suction-type agitator was used as the gas-liquid contact device.

The inventors presumed that since each time the ozone concentration difference was measured under the measurement conditions used in the aforementioned test, the discharge ozone concentration was a fixed value, that the ozone concentration in the test water (liquid phase) was also a fixed value, and that the rate of mass transfer of the ozone from the gas phase to the test water (liquid phase) was equal to the rate of self decomposition of the ozone in the test water.

It had been written in old reports, that the rate of self decomposition of the ozone at pH values near the neutral region suddenly increases. However, according to these test results, it was found that the amount of ozone decomposition suddenly increased at a pH of 9.5. Therefore, if the pH is less than 9.5, the amount of ozone consumed by the self decomposition reaction becomes less, and conversely, the amount of decomposition of the iron cyano complex ion suddenly increases, and it is possible to decompose the iron cyano complex ion until there is a sufficiently low concentration of the ion.

As shown in Tables 2-1 and 2-2 and FIG. 1, on the acidic side more than pH 7.0, it can be seen that the amount of self decomposition of ozone is nearly fixed and there is little change no matter how much the pH is lowered beyond that. Also, since the cyanide ions evaporates in cyanogen into the gas phase if the pH is lowered too much, it is best if a pH of 7.0 is taken to be the lower limit during actual operation.

To summarize the above results, when high-concentration ozone gas with an ozone concentration of 150 $g/m^3$ or more is brought into contact with iron cyano complex ion solution (waste fluid or test water), most of the ozone that is absorbed into that solution is consumed by self decomposition if the pH of the solution exceeds 9.5. In other words, ozone decomposition processing in the high pH range of pH 10 to 11 that was considered to be very effective for decomposition of free cyanide ion, cannot be said to be effective for the co-existing difficult-to-decompose metallic cyano complex ions because the self decomposition reaction becomes the major reaction after the free cyanide ion is decomposed.

Particularly, when decomposing iron cyano complex ions, it is important to keep the pH of the iron cyano complex ion solution (waste fluid or test water) at or below 9.5 in order to keep the self decomposition of ozone to a minimum and so that the decomposition of iron cyano complex ion is the main reaction. It is also important that the ozone gas used has an ozone concentration of 150 $g/m^3$ or more.

Reaction Tanks Connected in Series

In actual waste fluid, free cyanide ion and difficult-to-decompose metallic cyanide complex ions, such as iron cyano complex ion, exist together. It is not always necessary at first to adjust the pH of the waste fluid in the range from 7.0 and up to 9.5 before using the ozone, rather it is effective at first, to use any oxidation processing method to oxidize and decompose the free cyanide ion, and then to adjust the pH of the fluid to the set value for decomposing the iron cyano complex ions and bring it into contact with ozone gas having an ozone concentration of 150 $g/m^3$ or greater, in order to decompose the iron cyano complex ion in the waste fluid. When doing this, ozone can be used for decomposing the free cyanide ion.

Moreover, if the concentration of free cyanide ion is originally low in the waste fluid, for example, if it is less than 30 mg/liter while the majority of cyanide ions are difficult-to-decompose metallic cyanide complex ions, then high-concentration ozone can be used from the start on the waste fluid.

Furthermore, when decomposing, with ozone, waste fluid that contains cyanide ions including iron cyano complex ion, matter with high reaction selectability, such as thiocyanate or non-complex electrolytic free cyanide ion is first oxidized by the ozone and changed to cyanic acid ions in a high pH range of 10 to 11. After most of the free cyanide ion has been changed to the cyanic acid ions, then the remaining metallic cyano complex ions such as the iron cyano complex ion begin to be decomposed.

So, it is effective at first to oxidize and decompose the free cyanide ion by ozone, and then after most of the free cyanide ion has been decomposed, to adjust the settings for difficult-to-decompose cyano complex ions and to continue oxidation and decomposition by the use of ozone.

When applying this invention, a batch-type tanks can be used as the reaction tanks, or a continuous tank can be used. In the case of using a continuous tank, the waste fluid and that high-concentration ozone gas come into contact with each other in a counterflow manner, and the beginning section or upstream side, as seen from the flow of the waste fluid, is chiefly the zone where the free cyanide ion is decomposed, and the later section or downstream section is the zone where the difficult-to-decompose metallic cyano complex ions are decomposed.

It is good if the method for cost effectively consuming the raw ozone is set as described below.

Figure 2:
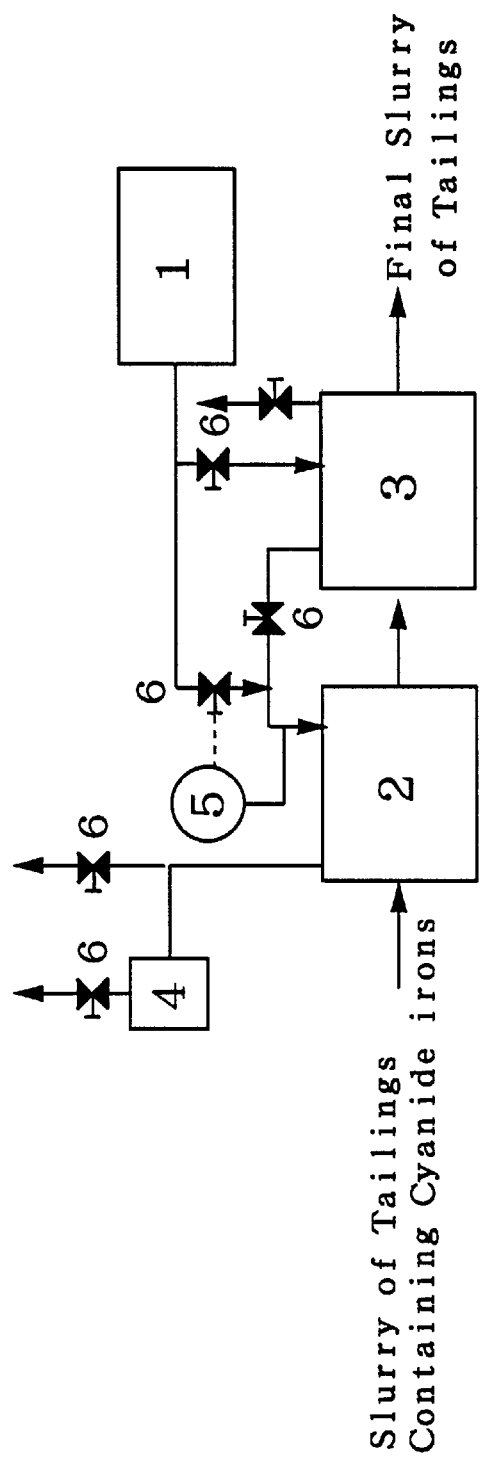
FIG. 2 is a schematic cross sectional view of a reaction tank structure used in the examples of the present invention.

In the case of reaction tanks that are connected continuously in series, it is best if the processing conditions are set for each respective reaction tank such that for example when using a continuous reaction tank divided into two section 2 and 3 in series as shown in FIG. 2, or when using two reaction tanks connected in series, the upstream section 2, as seen from the flow of the waste fluid, is chiefly for decomposing the free cyanide ion, and the later section or downstream section 3 is for the relatively difficult-to-decompose cyanide ions which include the iron cyano complex ion.

FIG. 2 shows a two stage reaction tank, however in the case of continuous processing, it is also possible to use three or more tanks, and the tanks may be constructed with internal partitions.

In this case, it is best if the waste fluid and high-concentration ozone gas flow come into contact with each other in a counterflow manner. In other words, in the waste fluid to be processed in the reaction tank at the beginning stage, as seen from the gas flow, or in other words the downstream reaction tank as seen from the flow of waste fluid, the concentration of free cyanide ion has already been reduced by the first processing, and the chemical contribution due to absorption of ozone is low, so even if ozone gas is circulated and brought into contact with the waste fluid with enough efficiency, most of it may be discharged without being physically absorbed during processing. It is then best if the ozone gas that is discharged from the later reaction tank and whose ozone concentration is still sufficient is removed and reused. Therefore, the reaction tanks are arranged in series, and the ozone is recirculated against the flow of waste fluid and brought into contact with it in a counterflow manner, and in the reaction tank in final stage as seen from the flow of gas, or in other words, the upstream section as seen from the flow of waste fluid, the ozone is finally brought into contact and caused to react with the initial free cyanide ion to be processed. Here, the concentration of free cyanide ion is higher than in the later stage, and since the ozone absorption rate is high enough, all of the ozone is absorbed.

FIG. 2 shows that there is piping so that the ozone gas that is recycled from the later reaction tank 3 as seen from the flow of the waste fluid can be reused in the front reaction tank 2. However, in order to keep at a constant value the ozone concentration of the ozone gas used in the front reaction tank 2, the tank is connected to an ozone concentration meter 5 as shown in FIG. 2, and the tank can be filled with additional ozone by operating the adjustment valve 6. When using the reaction tanks connected in series as shown in FIG. 2, the ratio of discharge gas that exits from the gas discharge outlet in the upstream reaction tank 3 as seen from the flow of the ozone gas, should be 80% or more of the discharge gas removed to the outside from the downstream reaction tank 2. Incidentally, oxygen is the main component of the discharge gas that is removed to the outside from the downstream reaction tank 2.

Mass Inlet Flow Rate of Ozone During Decomposition of Free Cyanide Ion

When settings are made as seen from the flow of the waste fluid, first the free cyanide ion is oxidized and decomposed, then after most of the free cyanide ion has been decomposed, the difficult-to-decompose cyano complex ions are decomposed.

If oxidation and decomposition by ozone is to be continued in multiple section processes, then the mass inlet flow rate of the ozone in the ozone gas into the front reaction tank as seen from the flow of the waste fluid should be 20 mg or less per minute per liter of waste fluid per section internal volume. By doing so, it is possible to make adjustments, even when using ozone gas that contains high-concentration ozone, so that the reaction ends at the time when the free cyanide ion is changed to cyanic acid ions in the first half of the section as seen from the flow of the waste fluid, and that it is possible to minimize the amount of the ozone component contained in the gas discharged from the first reaction tank (downstream tank as seen from the flow of the ozone gas).

One of the reasons for this is that under these conditions, the reaction speed in this part is determined by the mass transfer rate of the ozone. Also, regardless of the size of the reaction tank, by finely adjusting the ozone supply amount so that it is within a filling rate of 20 mg/L·min or less, is it easy to perform only the oxidation reaction from free cyanide ion to cyanic acid ions, and thus it is possible to control the rate of reaction. Particularly in the case of batch processing or continuous processing producing a flow near column flow, it is possible to stop the ozone oxidation right at the end of the reaction to cyanic acid ions, even when limited within a set residence time, so it is possible to greatly reduce the processing cost of this part.

If done as described above, it is possible to raise the consumption rate of the total raw ozone to 95% or more no matter how much difficult-to-decompose metallic cyano complex ions are contained in the waste fluid to be processed. The results of confirming these conditions are explained in detail in the embodiments.

When processing waste fluid containing cyanide ions with a normal total cyanide ion concentration of a few hundred mg/liter or less, it was found by the inventors through actual testing that if the rate at which ozone is filled into the reaction tank section where the free cyanide ion exists is 20 mg/L·min or less, most of the reaction from free cyanide ion to cyanic acid ions by ozone can be performed effectively from the aspect of the use of the raw material under the mass-transfer-determining of the total reaction speed, and when doing this, it is possible to keep the amount of ozone that is not physically absorbed to 5% or less of the amount filled into the tank.

However, if the capability of the gas-liquid contact mechanism that is used is insufficient, then the gas-liquid mixture is insufficient and the surface area on the boundary that is formed is small, and there is an amount of ozone that is directly output in the discharge gas at a fixed ratio without reaching the boundary.

The filling rate of the ozone referred to here is the amount of ozone mass weight that is filled into the first section (the upstream reaction tank as seen from the waste fluid) per unit time divided by the internal volume of that section.

What is desired in the embodiments of this invention is that after the object material, which includes the gas discharged from the reaction tank for decomposing the free cyanide ion, is processed, the discharge gas (which contains oxygen as the main compound) is finally discharged from the reaction tank, and then reused by a different process, for example, in other oxidation processes in the cyanide refining of gold. Furthermore, if this sub-product gas, whose main component is oxygen, is reused in the oxidation processes where air is conventionally used, it is then possible to shorten the time of those oxidation processes. Moreover, if the aforementioned discharge gas is used in processes in which oxidation is performed conventionally with the use of oxygen gas, then it is not necessary to newly prepare separate oxygen gas, and thus this method is effective in reducing the production cost by that amount.

Cyanide Refining Method Which Uses The Cyanide Ion Processing Method of This Invention The cyanide refining method is a very classical method, which essentially consists of a crushing process, a grinding process, a concentration process, a mixing process, a cleaning and filtering process, a gold and silver separation process, a purifying process and a cyanide recovery process. In the crushing process, received ore is crushed to a size in which it can be processed in the grinding process. In the grinding process, crushed ore is pulverized in a solution containing cyanide ions in a wet process to a desired grain size and leached. In the concentration process, leaching liquid is separated from residue. In the mixing process, the cyanide solution is added to the leaching residue so that the gold and silver in the residue is leached out again to obtain tailings and leaching liquid. In the cleaning and filtering process, cyanide ions in the tailings is minimized so that the tailings can be disposed of. In the gold and silver separation process, oxygen is removed from the leaching liquid, while zinc is added, so that the gold and silver are removed and recovered as precipitate by cementation. In the purifying process, gold and silver are obtained from the precipitate. In the cyanide recovery process, cyanide ions are recovered from the solution after the gold and silver have been separated and recovered. Also, a method of absorption using active carbon, or a method using ion exchange resin, can be used in the process to separate the gold and silver.

Regardless of the method used for separating the gold and silver, free cyanide ion and difficult-to-decompose metallic cyano complex ions are contained in the tailings that are produced and in the waste fluid after the cyanide ions are recovered. In the cyanide refining of this invention, the cyanide which adheres to the aforementioned tailings, the cyanide ions in the final solution after cyanide recovery and the cyanide ions in the final solution after separating the gold and silver for recovery is decomposed using high-concentration ozone gas.

Generally, it is recommended that the cyanide refining method be applied to low-grade gold ore, and is not considered to be the best method for processing medium or high-grade ore. The cyanide refining method of this invention, however, is for processing medium and high-grade ore and described below.

First, the ore is crushed and the coarse gold and silver grains are recovered according to specific gravity dressing, then the generated residue ore is subjected to flotation dressing where the gold and silver component which makes up the major part of the residue ore is recovered as concentrate, the produced tailings is brought into contact with the cyanide ion solution, where the gold and silver are leached out as cyano complex ions, then the gold and silver component in the resulting leaching liquid is adsorbed by active carbon or ion exchange resin, then the obtained final solution after gold and silver recovery is reused and part of the solution after gold and silver recovery, the active carbon wash solution, and the leaching residue are brought into contact with high-concentration ozone gas at a specified pH value and the cyanide ions are decomposed, then the residue is collected, and the final solution after gold and silver recovery and active carbon wash solution can be reused, so that the water system can be closed.

EXAMPLE 1

An oxidation decomposition test was performed on the waste water which contained the slurry after cyanide refining. Part of the free cyanide ions contained in it was already oxidized and decomposed, where the slurry concentration was 50%, and the iron cyano complex ion in the remaining cyanide component had a set concentration of cyanide ions in the range of a few hundred to a thousand mg/liter. Equal specified amounts of each were obtained as the test fluid, and filled into a hermetic reaction tank of the gas circulation-agitating-type, where ozone gas with an ozone concentration of 200 g/m$^3$ was filled into the tank from the outside at a set filling rate.

Gas samples were obtained, at the inlet and outlets, of the gas that enters and leaves the reaction tank, then the ozone concentration of each was measured using an ultraviolet-absorption-meter for ozone concentration (OZM 7000 manufactured by Okitronics Co., Ltd.). The actual amount of ozone that was consumed by the test fluid was continuously read out for accumulation from the difference in the two ozone concentrations and the circulation speed at that instant, and from this result, the total amount of ozone that was actually consumed in the test fluid was calculated.

Moreover, a small sample of the test fluid was taken at specified times, and the total cyanide ion concentration was analyzed. The pH of the test fluid was maintained at 8.0 from start to finish, and the test was performed in two systems under two different temperature conditions of 20° C. and 30° C. The measured values obtained up to 180 minutes after the start of the test were collected, and the relationship between the accumulated amount of consumed ozone and the rate of decomposition with reference to the initial concentration is shown in Tables 3-1 and 3-2.

It was found that decomposition rate of iron cyano complex ion after 180 minutes was 90% at 20° C., and 97% at 30° C., and that there is nearly a linear relationship between the ozone consumption per unit volume and the decomposition rate of cyanide ions. Here, by setting the pH in the condition that it is difficult for self decomposition of ozone to occur, it was found that the decomposition of iron cyano complex ions was technologically possible.

TABLE 3-1

At solution temperature 21° C.

| elasped time (min) | ozone consumption (mg/L) | reaction rate (decomposition rate of iron cyano complex ion) |
|---|---|---|
| 0 | 0 | 0% |
| 30 | 3120 | 54% |
| 60 | 3827 | 70% |
| 90 | 4143 | 81% |
| 120 | 4816 | 88% |
| 180 | 5556 | 92% |

TABLE 3-2

At solution temperature 31° C.

| elasped time (min) | Ozone consumption (mg/L) | reaction rate (decomposition rate of iron cyano complex ion) |
|---|---|---|
| 0 | 0 | 0% |
| 30 | 2117 | 42% |
| 60 | 2985 | 65% |
| 120 | 4153 | 90% |
| 180 | 5841 | 97% |

EXAMPLE 2

Except that ozone gas with an ozone concentration of 150 g/m$^3$ is used, the test was performed under the same conditions as Example 1 at a solution temperature of 31° C. The values measured for 180 minutes after the test began were collected, and the relationship between the accumulated ozone consumption and the decomposition rate with reference to the initial concentration is as shown in Table 4.

TABLE 4

At solution temperature 31° C.

| elasped time (min) | Ozone consumption (mg/L) | reaction rate (decomposition rate of iron cyano complex ion) |
|---|---|---|
| 0 | 0 | 0% |
| 30 | 1280 | 13% |
| 60 | 2240 | 33% |
| 120 | 3420 | 54% |
| 180 | 4400 | 66% |

COMPARISON EXAMPLE 1

Except that ozone gas with an ozone concentration of 120 g/m$^3$ is used, the test was performed under the same conditions as Example 1 at a solution temperature of 31° C. The values measured for 180 minutes after the test began were collected, and the relationship between the accumulated ozone consumption and the decomposition rate with reference to the initial concentration is as shown in Table 5.

TABLE 5

At solution temperature 31° C.

| elasped time (min) | Ozone consumption (mg/L) | reaction rate (decomposition rate of iron cyano complex ion) |
|---|---|---|
| 0 | 0 | 0% |
| 30 | 1055 | 6% |
| 60 | 2210 | 18% |
| 120 | 3400 | 38% |
| 180 | 4500 | 49% |

The relationship between the amount of ozone consumption per unit volume and the cyanide ion decomposition rate was linear, however, the rise in the cyanide ion decomposition rate, was small when compared with the results of Examples 1 and 2, and a larger problem is that the decomposition rate was less than 50% within a reaction time of 3 hours, which differs far from the processing time at the practical level.

EXAMPLE 3

Except for maintaining the pH of the test fluid at 10.5 from start to finish, the test was performed under the same conditions as in Example 1. The values measured for 180 minutes after the test began were collected, and the relationship between the accumulated ozone consumption and the decomposition rate with reference to the initial concentration is as shown in Table 6.

TABLE 6 solution temperature 31° C.

| elasped time (min) | Ozone consumption (mg/L) | reaction rate (decomposition rate of iron cyano complex ion) |
|---|---|---|
| 0 | 0 | 0.00 |
| 60 | 3303 | 0.44 |
| 120 | 6864 | 0.60 |
| 180 | 10990 | 0.71 |

Figure 3:
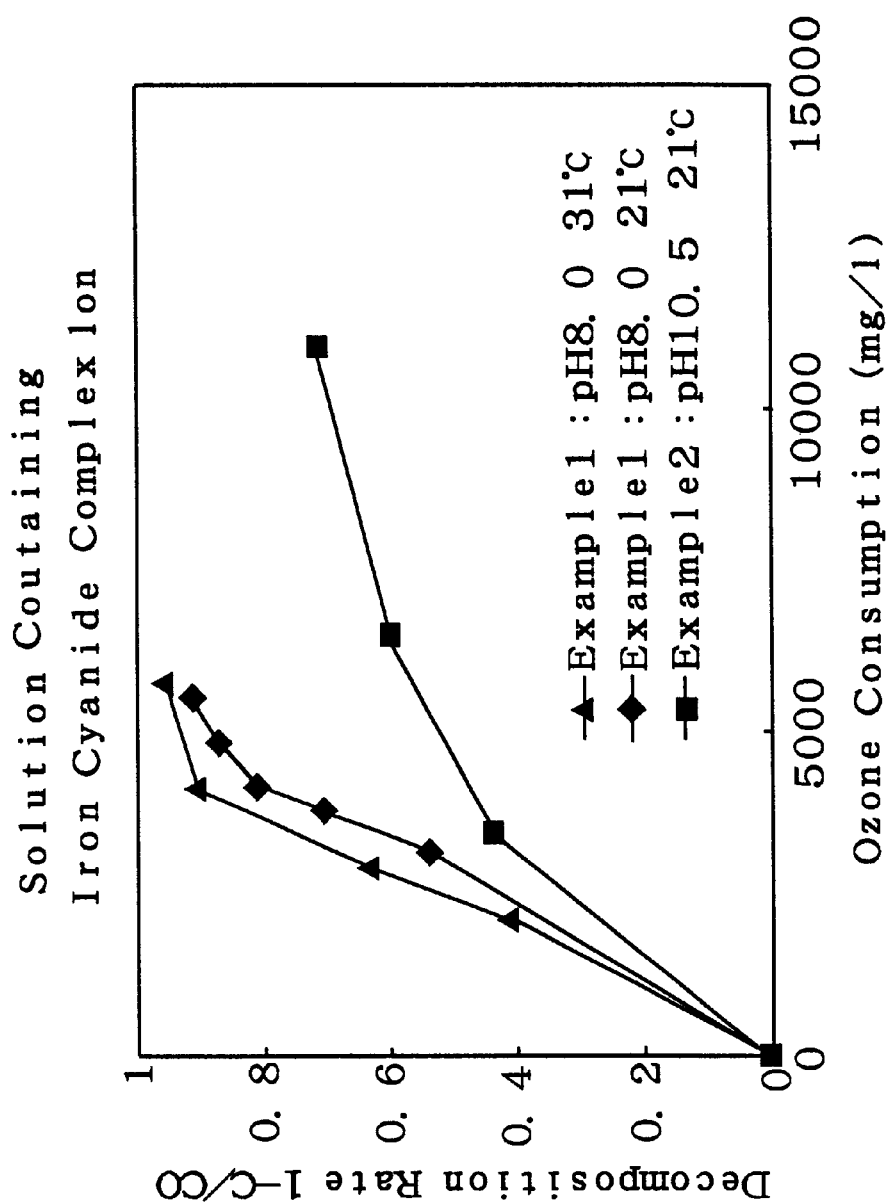
FIG. 3 is a graph showing a relation between cyanide ion decomposition rate and ozone consumption in Examples 1 and 2 of the present invention.

In order to compare the results with those of Example 1, the results of both Example 1 and Example 3 are plotted together in a graph as shown in FIG. 3.

In Example 3, decomposition of the iron cyano complex ions did not largely exceed 60%, also, it was found that the decomposition rate with respect to the ozone consumption leveled off during the middle of the reaction, and the decomposition rate of the cyanide ions with ozone greatly decreased during the reaction.

It is supposed that the reason for this is that since the pH condition was such that it was easy for the self decomposition of ozone to occur, as the concentration of the iron cyano complex ion decreased, the speed that the ozone was consumed by self decomposition was faster than the speed that the ozone was consumed during the reaction with the iron cyano complex ions.

It was shown that if high-concentration ozone gas was used, by setting the pH condition to a suitable range, lowering the concentration of cyanide ions, including the iron cyano complex ions, becomes easier.

EXAMPLE 4

Fifteen liters of cyanide refining waste water, whose initial concentration of free cyanide ion was 160 mg/liter, was used as the object of decomposition and was brought in a gas circulation manner into continuous contact with ozone gas having an ozone concentration of 200 g/m$^3$, and the decomposition of cyanide ions by ozone was tested in a semi-batch system. Waste water with an initial pH of 10.4 was entirely filled into the 15-liter reaction tank, and it was caused to react with ozone at an initial temperature of 25° C. using the gas circulation contact method, and ozone oxidation of cyanide ions was allowed to occur.

During the test, the gas-liquid boundary area between the ozone gas and slurry was increased by using a gas circulation contact mixer for slurry (400 W) as the reaction tank, and agitating was sufficiently maintained as eddy currents occurred near the boundary.

Ozone gas with an ozone concentration of 200 g/m$^3$ was produced with a discharge-type ozonizer using pure oxygen, and after using the ozone gas to process waste water containing mainly difficult-to-decompose metallic cyanide complex ions in a separate reaction tank, the ozone gas that was discharged from that reaction tank without being absorbed by that waste water was reused and supplied to the aforementioned 15-liter gas circulation-contact mixer reaction tank.

A sample of gas at both the gas inlet and outlet was taken from time to time, and the concentration of the ozone gas was measured using a ultraviolet-absorption-type ozone concentration meter (OZM 7000 manufactured by Okitronics Co., Ltd.), and the amount of ozone that was physically absorbed in the reaction tank was calculated from those values and the gas circulation speed. Also, samples were taken from the reaction tank occasionally, and the concentration of the free cyanide ion and the cyanic acid ions were analyzed.

In this example, the filling rate of the ozone was adjusted to a constant flow such that the amount of ozone per volume of the reaction tank (liters) and time (minutes) was 10 mg/L·min and it was fed into the aforementioned gas circulation-contact mixer reaction tank. When doing so, at 60 minutes after the beginning of the reaction, the progression rate of the oxidation from free cyanide ion to cyanic acid ions was 98.5% based on the weight of cyanide as a reference, and further progression of the oxidation reaction from cyanic acid ions was kept to less than 4% in the weight of the already produced cyanic acid ions.

The amount of ozone that was physically absorbed in the waste water during 60 minutes after the beginning of the reaction was equal to the amount of ozone that was consumed in the aforementioned chemical reaction, or in other words the amount that was chemically absorbed. Moreover, during the first 60 minutes of the reaction, the amount of ozone that existed in the exhaust gas that was not physically absorbed was less than 4% the total amount of ozone that was filled inside the tank from the outside.

The amount of exhaust gas that was output from the separate reaction tank, after being used in that tank to process cyanide waste water mainly containing difficult-to-decompose metallic cyano complex ions, was 35% the amount of gas that was filled in the tank initially. Moreover, an average of 90% of that was filled into the reaction tank (gas circulation-contact mixer) for decomposing free cyanide ion. The resulting total consumption rate of the raw ozone was 95%. The temperature rise in the reaction tank (gas circulation-contact mixer) after 60 minutes was only 2° C., and thus there was hardly any temperature change.

The test was repeated by sequentially changing only the initial temperature in the procedure above to 20° C. and 15° C., and leaving all of the other conditions exactly the same. The results were nearly the same as the initial results, so it was possible to confirm the repeatability of the effect of using ozone.

From these observations during the first 60 minutes of the reaction in the reaction tank for decomposing free cyanide ion, three facts were obtained:

1) The rate of oxidation of the free cyanide ion had hardly any dependence on the temperature and determined by the speed of mass transfer of ozone.
2) The amount of ozone that was output without being physically absorbed was nearly non-existent.
3) The 'selection rate' of the free cyanide ion to react with the ozone was sufficiently maintained at a high rate during the reaction until the concentration of free cyanide ion reached the low concentration range.

From these facts it was made clear that when the filling rate of ozone into the waste water from cyanide refining that contains cyanide ions is 10 mg/L·min, it is easy to adjust the speed of oxidation from free cyanide ion to cyanic acid ions by just adjusting this filling rate near this range.

Furthermore, the gas that was discharged during decomposition of the free cyanide ion in this test was put into a gas analyzer and the composition was analyzed. It was found that it was an oxygen gas which contained 99% or more oxygen in concentration. Moreover, it was found that this exhaust gas could be effectively reused in other processes such as oxidation processing using oxygen.

COMPARISON EXAMPLE 2

The filling rate for ozone was changed to 30 mg/L·min and the test was performed at 25° C. under the exactly same conditions as Example 4. At 20 minutes after the beginning of the reaction, most of the free cyanide ion was oxidized. However, there was still about 10% of the free cyanide ion remaining. And of the cyanic acid ions that were generated, 10% were further oxidized and at this point they were transformed to a different oxidation form. Also, unlike in the case of Example 4, the ozone concentration in the exhaust gas could be already be detected right after the beginning of the reaction. Since in this case the filling rate of the ozone was larger than in Example 4, the speed of the reaction from free cyanide ions to cyanic acid ions was not simply determined by the rate of mass transfer of the ozone as in the case of Example 4, and worse the progression of each reaction changed such that it was difficult to control them individually from the outside. Moreover, the use efficiency of raw ozone in the oxidation reaction from free cyanide ion to cyanic acid ions was lower than that in Example 4.

With this invention it is possible to lower the concentration of cyanide ions including iron cyano complex ion, by increasing the concentration of ozone, and by keeping the pH to a suitable level, it is possible to control the self decomposition reaction of the ozone. As a result, it was possible to more completely decompose difficult-to-decompose cyano complex ions, such as iron cyano complex ion or nickel cyano complex ion, using ozone. The higher the ozone concentration of the ozone gas used, the more effective the invention is.

Also, the raw materials used for producing the ozone are just electricity and air, and when ozone is decomposed, only oxygen is produced, and thus secondary matter that pollutes the environment is not produced when compared to other chemical processes. Therefore, this invention is very effective from the aspect of protecting the environment.

Moreover, from the aspect of controlling the reaction when decomposing the free cyanide ion in the case of processing the cyanide ions in the waste water from cyanide refining that controls difficult-to-decompose metallic cyano complex ions, by using this invention, it is possible to easily control the progression of the reaction by external control. Therefore, it is possible to perform processing in this part economically. Also, the exhaust gas, whose main component is oxygen, is stable in composition with low ozone concentrations, so it is possible to use it effectively as much as possible.

What is claimed is:

1. A method for decomposing free cyanide ion and metallic cyano complex ions in a liquid, comprising the steps of bringing the liquid into contact with ozone gas in the condition that the pH of the liquid is at least 10, and then bringing the liquid into contact with ozone gas having an ozone concentration of at least 150 g/m$^3$ in the condition that the pH of the liquid is 7.0 to 9.5.

2. The method of claim 1, wherein when bringing the liquid having a pH of at least 10 into contact with the ozone gas, the mass flow rate of the ozone in the ozone gas is up to 20 mg per minute per liter of liquid.

3. The method of claim 1, further comprising a step of providing at least two reaction sections that are arranged in series with reference to the flow of the liquid, wherein the liquid and the ozone gas come into contact with each other in a counterflow relation.

4. The method of claim 3, wherein the amount and ozone concentration of ozone gas entering in an upstream reaction section is adjusted at a downstream reaction section.

5. The method of claim 3, further comprising the step of decomposing the free cyanide ion and easy-to-decompose metallic cyano complex ions in contact with ozone gas in the condition that the pH of the liquid is at least 10 in the upstream reaction section, and decomposing difficult-to-decompose metallic cyano complex ions in the downstream reaction section in contact with ozone gas having an ozone concentration of at least 150 $g/m^3$.

6. The method of claim 3, wherein the mass inflow speed of the ozone in the ozone gas is up to 20 mg per minute per liter of liquid in the upstream reaction section.

7. The method of claim 4, wherein the mass inflow speed of the ozone in the ozone gas is up to 20 mg per minute per liter of liquid in the upstream reaction section.

8. The method of claim 5, wherein the mass inflow speed of the ozone in the ozone gas is up to 20 mg per minute per liter of liquid in the upstream reaction section.

9. The method of claim 3, wherein the reaction section is selected from the group of areas divided in a reaction tank, and reaction tanks connected with each other in series.

10. The method of claim 4, wherein the reaction section is selected from the group of areas divided in a reaction tank, and reaction tanks connected with each other in series.

11. The method of claim 5, wherein the reaction section is selected from the group of areas divided in a reaction tank, and reaction tanks connected with each other in series.

12. A method of cyanide refining, wherein the waste fluid from the cyanide refining is the liquid to be processed through the method of claim 3.

13. A method of cyanide refining of claim 12, wherein after processing the waste fluid, the discharged exhaust gas, which contains oxygen, is reused in a pre-oxidation process for the cyanide refining of gold.

14. A method for decomposing free cyanide ion and metallic cyano complex ions in a liquid comprising the steps of bringing the liquid into contact with high concentration ozone gas in the condition that the pH of the liquid is at least 10, and then bringing the liquid into contact with ozone gas in the condition that the pH of the liquid is 7.0 to 9.5.

15. The method of claim 14, wherein when bringing the liquid having a pH of at least 10 into contact with the ozone gas, the mass flow rate of the ozone in the ozone gas is up to 20 mg per minute per liter of liquid.

16. The method of claim 14, further comprising a step of providing at least two reaction sections that are arranged in series with reference to the flow of the liquid, wherein the liquid and the ozone gas come into contact with each other in a counterflow relation.

17. The method of claim 16, wherein the amount and ozone concentration of ozone gas entering in an upstream reaction section is adjusted at a downstream reaction section.

18. The method of claim 16, further comprising the step of decomposing the free cyanide ion and easy-to-decompose metallic cyano complex ions in contact with ozone gas in the condition that the pH of the liquid is at least 10 in the upstream reaction section, and decomposing difficult-to-decompose metallic cyano complex ions in the downstream reaction section in contact with ozone gas having an ozone concentration of at least 150 $g/m^3$.

19. The method of claim 16, wherein the mass inflow speed of the ozone in the ozone gas is up to 20 mg per minute per liter of liquid in the upstream reaction section.

20. The method of claim 17, wherein the mass inflow speed of the ozone in the ozone gas is up to 20 mg per minute per liter of liquid in the upstream reaction section.

21. The method of claim 18, wherein the mass inflow speed of the ozone in the ozone gas is up to 20 mg per minute per liter of liquid in the upstream reaction section.

22. The method of claim 16, wherein the reaction section is selected from the group of areas divided in a reaction tank, and reaction tanks connected with each other in series.

23. The method of claim 17, wherein the reaction section is selected from the group of areas divided in a reaction tank, and reaction tanks connected with each other in series.

24. The method of claim 18, wherein the reaction section is selected from the group of areas divided in a reaction tank, and reaction tanks connected with each other in series.

25. A method of cyanide refining, wherein the waste fluid from the cyanide refining is the liquid to be processed through the method in claim 16.

26. A method of cyanide refining of claim 25, wherein after processing the waste fluid, the discharged exhaust gas, which contains oxygen, is reused in a preoxidation process for the cyanide refining of gold.

* * * * *